(12) United States Patent
Vaghani et al.

(10) Patent No.: US 8,700,585 B2
(45) Date of Patent: Apr. 15, 2014

(54) OPTIMISTIC LOCKING METHOD AND SYSTEM FOR COMMITTING TRANSACTIONS ON A FILE SYSTEM

(75) Inventors: Satyam B. Vaghani, Palo Alto, CA (US); Yuen-Lin Tan, Pacifica, CA (US)

(73) Assignee: VMware, Inc., Palo Alto, CA (US)

(*) Notice: Subject to any disclaimer, the term of this patent is extended or adjusted under 35 U.S.C. 154(b) by 818 days.

(21) Appl. No.: 12/324,665

(22) Filed: Nov. 26, 2008

(65) Prior Publication Data

US 2009/0106248 A1 Apr. 23, 2009

Related U.S. Application Data

(63) Continuation-in-part of application No. 11/707,724, filed on Feb. 16, 2007, and a continuation-in-part of application No. 10/773,613, filed on Feb. 6, 2004, now Pat. No. 7,849,098, and a continuation-in-part of application No. 11/676,109, filed on Feb. 16, 2007, now Pat. No. 8,560,747.

(51) Int. Cl.
*G06F 17/30* (2006.01)

(52) U.S. Cl.
USPC .......................................... 707/704

(58) Field of Classification Search
USPC ................... 707/704, 781, 782, 783
See application file for complete search history.

(56) References Cited

U.S. PATENT DOCUMENTS

| | | | |
|---|---|---|---|
| 4,429,360 A | 1/1984 | Hoffman et al. | |
| 5,151,988 A | 9/1992 | Yamagishi | |
| 5,226,159 A | 7/1993 | Henson et al. | |
| 5,251,318 A * | 10/1993 | Nitta et al. | 711/152 |
| 5,414,840 A | 5/1995 | Rengarajan et al. | |
| 5,502,840 A | 3/1996 | Barton | |
| 5,606,679 A * | 2/1997 | Cohn et al. | 711/4 |
| 5,692,178 A | 11/1997 | Shaughnessy | |
| 5,848,241 A | 12/1998 | Misinai et al. | |
| 6,009,427 A * | 12/1999 | Wolff | 1/1 |
| 6,078,982 A * | 6/2000 | Du et al. | 710/200 |
| 6,105,085 A * | 8/2000 | Farley | 710/41 |
| 6,105,099 A | 8/2000 | Freitas et al. | |
| 6,128,710 A * | 10/2000 | Greenspan et al. | 711/152 |
| 6,247,023 B1 | 6/2001 | Hsiao et al. | |
| 6,330,560 B1 | 12/2001 | Harrison et al. | |
| 6,389,420 B1 | 5/2002 | Vahalia et al. | |
| 6,466,978 B1 | 10/2002 | Mukherjee et al. | |
| 6,609,128 B1 | 8/2003 | Underwood | |
| 6,622,163 B1 * | 9/2003 | Tawill et al. | 709/211 |
| 6,658,417 B1 | 12/2003 | Stakutis | |
| 6,842,896 B1 | 1/2005 | Redding et al. | |

(Continued)

OTHER PUBLICATIONS

Windows 2000 Support, How to specify an IP address, Last revised Oct. 31, 2006, Microsoft, http://support.microsoft.com/kb/308199.

(Continued)

*Primary Examiner* — Rehana Perveen
*Assistant Examiner* — Mark E Hershley

(57) ABSTRACT

In a file system shared by multiple servers, reservation of a data storage unit such as a LUN of a disk array to acquire locks in order to commit a transaction acting on data stored in the data storage unit is deferred until the transaction is completed in RAM and the locks can be acquired in parallel during a single instance of reserving the data storage unit.

20 Claims, 9 Drawing Sheets

(56) References Cited

U.S. PATENT DOCUMENTS

| | | | |
|---|---|---|---|
| 7,089,561 B2 | 8/2006 | Morrison et al. | |
| 7,107,267 B2* | 9/2006 | Taylor | 1/1 |
| 7,117,481 B1 | 10/2006 | Agesen et al. | |
| 7,124,131 B2* | 10/2006 | Guthridge et al. | 1/1 |
| 7,240,057 B2 | 7/2007 | Kingsbury et al. | |
| 7,284,151 B2* | 10/2007 | Chandrasekaran | 714/5.11 |
| 7,289,992 B2 | 10/2007 | Walker | |
| 7,293,011 B1* | 11/2007 | Bedi et al. | 1/1 |
| 7,490,089 B1 | 2/2009 | Georgiev | |
| 7,502,752 B1 | 3/2009 | Lemons et al. | |
| 7,516,285 B1 | 4/2009 | Haynes et al. | |
| 7,552,122 B1* | 6/2009 | Georgiev | 1/1 |
| 7,711,539 B1* | 5/2010 | Kimmel et al. | 703/24 |
| 7,849,098 B1 | 12/2010 | Scales et al. | |
| 8,321,643 B1 | 11/2012 | Vaghani et al. | |
| 2002/0016771 A1 | 2/2002 | Carothers et al. | |
| 2002/0143704 A1 | 10/2002 | Nassiri | |
| 2002/0174139 A1 | 11/2002 | Midgley et al. | |
| 2003/0041227 A1* | 2/2003 | Nakamatsu | 712/200 |
| 2003/0065672 A1* | 4/2003 | Kingsbury et al. | 707/100 |
| 2003/0225760 A1 | 12/2003 | Ruuth et al. | |
| 2004/0073831 A1 | 4/2004 | Yanai et al. | |
| 2004/0078658 A1 | 4/2004 | Park et al. | |
| 2004/0117580 A1 | 6/2004 | Wu et al. | |
| 2004/0215670 A1 | 10/2004 | Holenstein et al. | |
| 2004/0249838 A1 | 12/2004 | Hinshaw et al. | |
| 2004/0268062 A1* | 12/2004 | Ofer | 711/152 |
| 2005/0091238 A1 | 4/2005 | Zane et al. | |
| 2005/0149683 A1* | 7/2005 | Chong et al. | 711/162 |
| 2006/0047713 A1 | 3/2006 | Gornshtein et al. | |
| 2006/0069665 A1 | 3/2006 | Yamakawa et al. | |
| 2007/0083687 A1 | 4/2007 | Rinaldi et al. | |
| 2007/0214161 A1* | 9/2007 | Goyal et al. | 707/101 |
| 2009/0106248 A1 | 4/2009 | Vaghani et al. | |
| 2010/0017409 A1 | 1/2010 | Rawat et al. | |
| 2011/0179082 A1 | 7/2011 | Vaghani et al. | |

OTHER PUBLICATIONS

Helmig, Windows 2000/XP TCP/IP protocol, Feb. 18, 2001, WindowsNetworking.com, http://windowsnetworking.com/articles_tutorials/w2ktcpip.html.

The Authoritative Dictionary of IEEE Standards Terms, 2000, IEEE, 7th ed. p. 318.

Non-Final Rejection Mailed on Nov. 17, 2009 for U.S. Appl. No. 11/676,109, filed Feb. 16, 2007.

Venners, "Inside the Java Virtual Machine" unknown but at least 1998, Computing McGraw-Hill 2nd Edition, Chapter 5, 3 pages.

* cited by examiner

OPTIMISTIC LOCKING METHOD AND SYSTEM FOR COMMITTING TRANSACTIONS ON A FILE SYSTEM

CROSS-REFERENCE TO RELATED APPLICATIONS

The present application is a continuation-in-part of U.S. patent application Ser. No. 11/707,724, filed on Feb. 16, 2007, which is a continuation-in-part of U.S. patent application Ser. No. 10/773,613, filed on Feb. 6, 2004. The present application is also a continuation-in-part of U.S. application Ser. No. 11/676,109, filed Feb. 16, 2007.

BACKGROUND

A shared file system typically refers to an enterprise storage file system that is concurrently shared (i.e., accessed for reading and writing) by multiple computer systems. One example of such a shared file system is VMware's VMFS (Virtual Machine File System), which enables multiple virtual machines that are instantiated on one or more physical servers to operate under a common file system whose data storage is implemented on a shared data storage system. An example of such a shared data storage system is a disk array accessible through a storage area network (SAN). A typical SAN provides access to a number of data storage systems that are physically independent enclosures containing a storage system manager (e.g., a disk array controller), a disk cache and multiple physical data storage units (e.g., disk drives). The storage system manager manages the physical data storage units and exposes them to the connected computer systems as logical data storage units, each identified by a logical unit number (LUN), enabling storage operations to be carried out on the LUNs using storage hardware.

Shared filed systems need to implement concurrency control mechanisms to prevent multiple contexts (i.e., processes running on the connected computer systems) from simultaneously accessing the same file system resources resulting in data corruption and unintended data loss. One such concurrency control mechanism utilizes the notion of acquiring locks corresponding to file system resources (e.g., files, file descriptors, data block bitmaps, etc.) prior to acting upon such file system resources.

The acquisition of locks, itself, involves "reserving" the data storage unit (e.g., LUN) upon which the lock (and corresponding file system resource and/or data) resides, such that only the context desiring to acquire the lock has exclusive access to the data storage unit. After acquiring the desired lock, the context releases its reservation, freeing the data storage unit to service other contexts. In an architecture where the computer systems are connected to a SAN by a SCSI interface (Small Computer System Interface), one example of such a reservation system is the conventional SCSI reservation command that can be issued by a file system to a LUN in the SAN on behalf of a context running on a connected computer system.

Reserving the data storage unit to acquire a desired lock prevents multiple contexts from simultaneously trying to acquire the same lock. Specifically, without reserving the data storage unit, two competing contexts could both read a lock simultaneously, determine that the lock is free, and then both write the lock to acquire it (i.e., write an identifier value to an ownership field in the lock). Each context would conclude that it had successfully acquired the lock and access the lock's corresponding file system resource or data, causing data loss and corruption. However, reserving the data storage unit to acquire locks in this manner can be a significant bottleneck because it prevents other contexts from accessing unrelated resources and data that coincidentally reside on the same data storage unit until the reservation is released. This bottleneck is exacerbated because typical actions performed by contexts on file system resources require the acquisition of multiple locks, thereby increasing the number and duration of reservations.

SUMMARY

One or more embodiments of the present invention provide an "optimistic locking" method and system for committing a transaction that defers the need to exclusively reserve a data storage unit to acquire locks for a transaction until the transaction is first completed in memory and the locks can be located and acquired simultaneously under a single reservation of the data storage unit. By reducing the number of times a data storage unit needs to be reserved to acquire locks and increasing operational efficiency during a reservation, such a method and system reduces the bottleneck of previous journaling methodologies that request a separate data storage unit reservation for each lock required by the transaction.

A method to be performed through a shared file system, according to an embodiment of the invention, provides for committing a transaction acting upon data stored in a data storage unit. The method includes the steps of reading a state of a set of locks relating to the data, constructing a completed transaction in memory prior to acquiring the locks, acquiring exclusive possession of the data storage unit, acquiring the locks if the state of the locks has not changed since said reading; and committing the completed transaction.

In another embodiment, a computer readable storage medium having stored therein a computer program for committing a transaction acting upon data stored in a data storage unit is disclosed. The computer system executing the computer program carries out reading a state of a set of locks relating to the data and constructing a completed transaction in memory prior to acquiring the locks. The computer system executing the computer program further performs acquiring exclusive possession of the data storage unit, acquiring the locks if the state of the locks has not changed since said reading, and committing the completed transaction.

DETAILED DESCRIPTION

Figure 1:
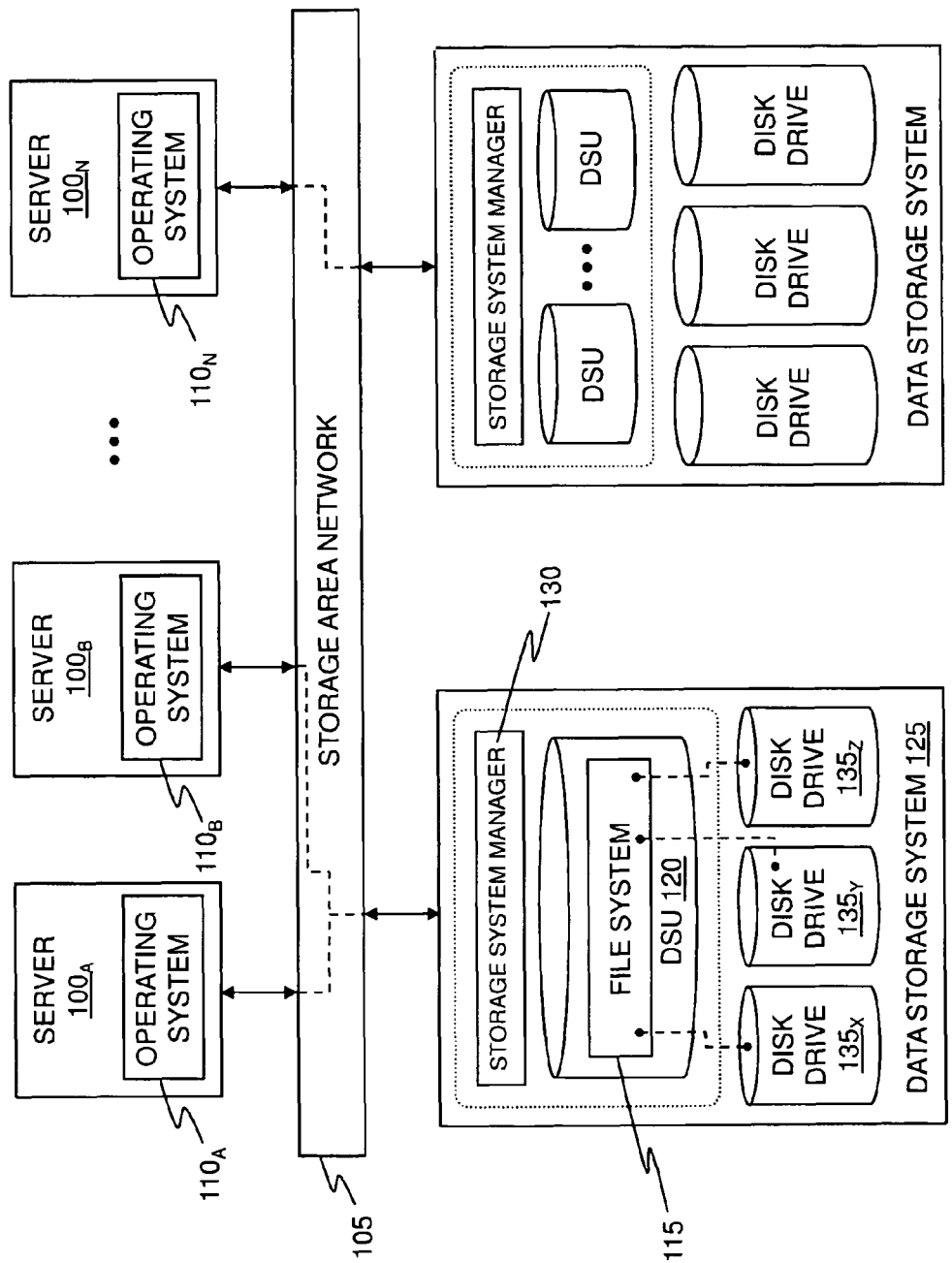
FIG. 1 depicts a computer system configuration utilizing a shared file system in which one or more embodiments of the invention may be implemented.

FIG. 1 illustrates one example of a computer system configuration utilizing a shared file system in which one or more embodiments of the invention may be implemented. The computer system configuration of FIG. 1 includes multiple servers $100_A$ to $100_N$, each of which is connected to SAN 105. Operating systems $110_A$ and $110_B$ on servers $100_A$ and $100_B$ interact with a shared file system 115 that resides on a data storage unit (DSU) 120 accessible through SAN 105. In particular, data storage unit 120 is a LUN of a data storage system 125 (e.g., disk array) connected to SAN 105. While LUN 120 is exposed to operating systems $110_A$ to $110_B$ by system storage manager 130 (e.g., disk controller) as a contiguous logical storage space, the actual physical data blocks upon which shared file system 110 may be stored is dispersed across the various physical disk drives $135_X$ to $135_Z$ of data storage system 125.

Shared file system 115 contains a plurality of files of various types, typically organized into one or more directories. The file system 115 further includes metadata data structures that specify information about file system 115, such as block bitmaps that indicate which data blocks in file system 115 remain available for use, along with other metadata data structures indicating the directories and files in file system 115, along with their location. Sometimes referred to as a file descriptor or inode, each file and directory also has its own metadata data structure associated therewith, specifying various things, such as the data blocks that constitute the file or directory, the date of creation of the file or directory, etc.

Figure 2A:
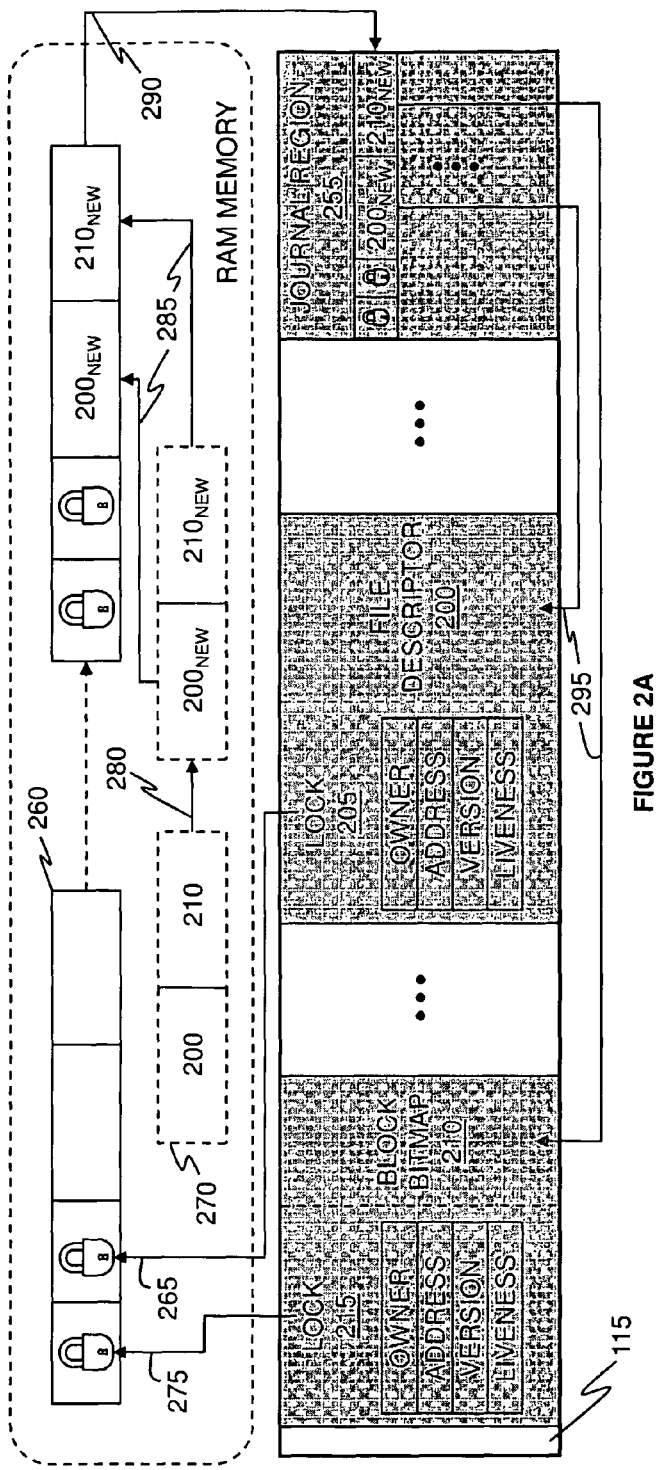
FIG. 2A depicts a state of a shared file system and memory during a process to commit a transaction.

As depicted FIG. 2A, these metadata data structures are stored in file system 115 and each have an associated lock. For example, to gain access to file descriptor 200, server $100_A$ needs to acquire its respective lock 205. Similarly, to gain access to block bitmap 210, server $100_A$ needs to acquire its respective lock 215.

Each of lock 205 and 215 includes an owner field, address field, version field, and liveness field. The owner field is used to identify a server, such as $100_A$ to $100_N$, that owns or possesses a lock. Each of servers $100_A$ to $100_N$ may be assigned a unique ID value, which can be inserted into a lock's owner field to indicate that the server owns the lock. A value of zero in the owner field indicates that a lock is not currently owned by any server (although other values may also be used for this purpose). The address field describes the location of a lock in the address space of the file system 115. The version field of a lock may be one of a number of different values, where the current value in the version field (i.e., the current version) indicates a temporally unique current state of the lock. Each time a lock is acquired or released, its version field is incremented as an atomic part of the lock acquisition and release process. The liveness field indicates whether the current owner of the lock as determined by the owner field is powered on and actively using the lock. The actual update of a liveness field may be achieved in a number of ways, including as described in U.S. application Ser. No. 10/773,613 (hereinafter, the '613 Application) and U.S. application Ser. No. 11/676,109 (hereinafter, the "'109 Application").

Figure 2B:
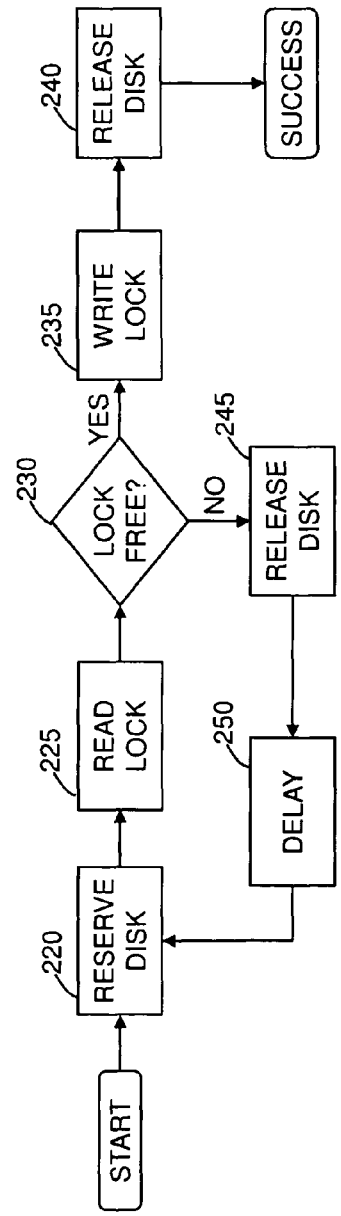
FIG. 2B is a flow chart illustrating a method for acquiring locks that may be utilized in one or more embodiments of the invention.

The acquisition of a lock may be achieved in a number of ways, including as described in the '613 Application. FIG. 2B is a flow chart illustrating one method of acquiring locks. At step 220, a server desiring to acquire a lock (i.e., on behalf of a context running on the server) reserves the data storage unit that contains the lock. For example, LUN 120 may implement a conventional SCSI reservation system, by which the entire LUN 120 may be reserved. Under such a SCSI reservation system, the entire LUN 120 is locked for the exclusive use of the server for as long as the SCSI reservation is in effect, from the time the server issues a disk reserve primitive to the time the server issues a disk release primitive, or until a reset occurs. In step 225, the server reads the lock to determine whether it is free. A lock is free, if, for example, its owner field has a value of zero or if the liveness of the lock has expired (as further detailed in the '613 Application). If the lock is free at decision step 230, then in step 235, the server acquires the lock by writing its own ID value into the owner field and by writing a new time value into the lock's liveness field. The server now has exclusive access to the data or metadata protected by the lock for a renewable lease period, beginning at this point in time. In the step 240, the server releases the SCSI reservation so that other computing entities may again access LUN 120, although the other computing entities are not entitled to access the data protected by the lock. If the lock is not free at decision step 230, then the server releases the SCSI reservation in step 245 and in step 250, delays for a period of time before returning to step 220 to try to acquire the lock again. Further details relating to the acquisition of locks as described herein can be found in the '613 Application.

Returning to FIG. 2A, shared file system 115 also includes a journal section 255 to store completed "transactions" prior to committing them in order to maintain and recover consistent metadata and data states in file system 115 in the event of server or storage system crashes. As will be further described in the context of FIG. 3, a transaction is a record of the locks that are required to protect that data (or metadata). Further details on transactions, journaling and journal based recovery techniques that may be utilized in embodiments of the present invention are found in U.S. patent application Ser. No. 11/707,724, entitled "Distributed Transaction System" (hereinafter, referred to as the "'724 Application").

Figure 3:
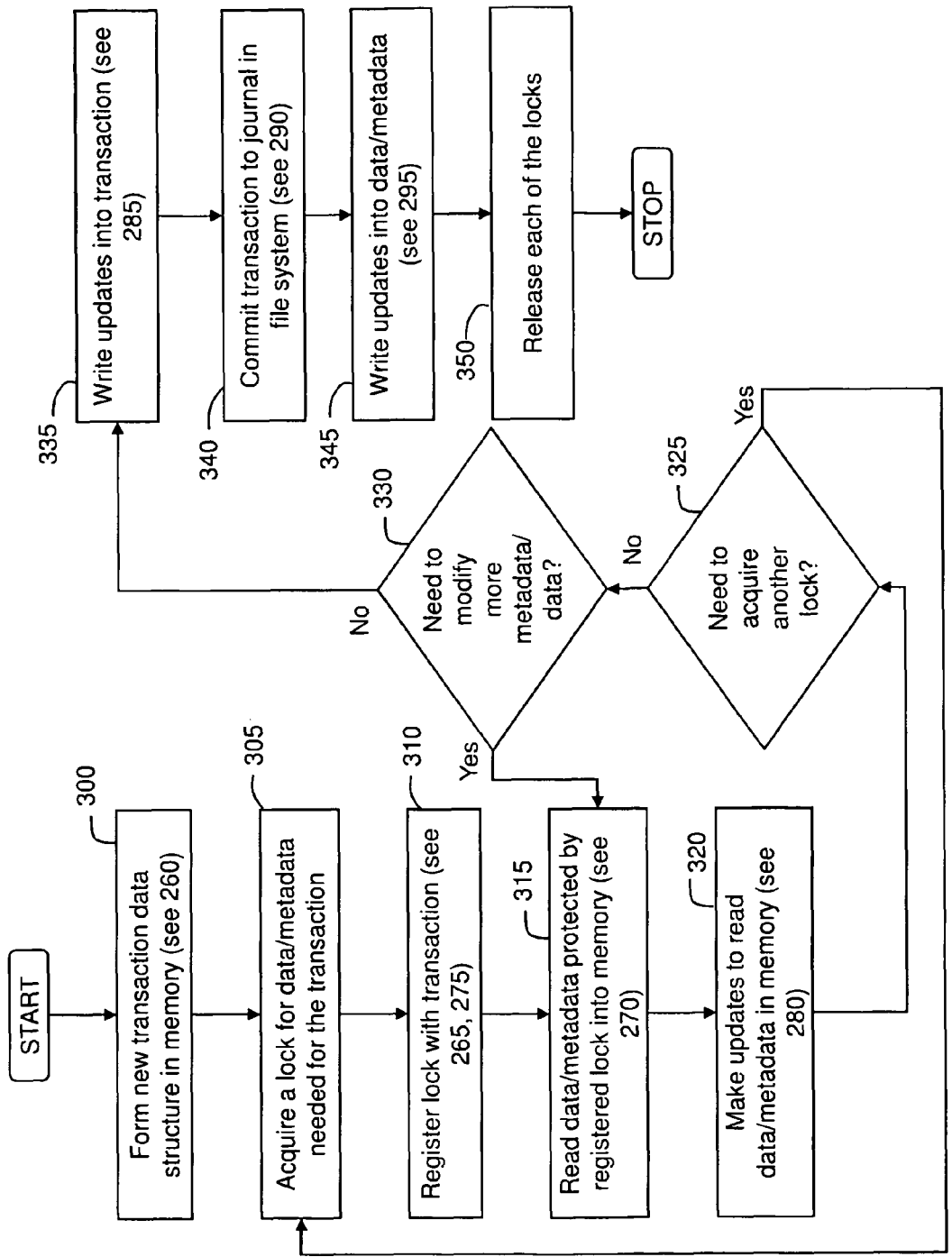
FIG. 3 is a flow chart for committing a transaction on a shared file system using "regular locking" techniques.

FIG. 3 is a flow chart for committing a transaction on a shared file system such as file system 115 utilizing a typical locking technique (hereinafter referred to as "regular locking"). In one example scenario, a context running on server $100_A$ may desire to write data to a file residing on file system 115. In executing a system call to write the data to the file, file system 115 accesses the file's file descriptor to determine whether the file's currently allocated space can support writing the data to the file. If the file's current allocated size is too small, file system 115 needs to allocate a free file block to the file by accessing a block bitmap of file system 115, scanning the bitmap for a free block, marking the block as used and adding a reference to the new block's address to the file descriptor of the file.

Following the steps of FIG. 3, to allocate an additional data block to the file as described in the foregoing scenario, in step 300, file system 115 forms a new transaction data structure in memory (see 260 in FIG. 2A). In step 305, it acquires a lock for data or metadata that is needed to complete the transaction in accordance with FIG. 2B. In the current example, file system 115 acquires lock 205 for file descriptor 200 of the file. In step 310, file system 115 registers the lock with the transaction data structure in memory by, for example, reading the lock and storing the address field and version field of the lock in the transaction data structure (see '724 Application for further details). This registration is illustrated in 265 of FIG. 2A for the current example. In step 315, file system 115 reads the corresponding data or metadata from disk into temporary memory buffers and in step 320, if needed, makes the appropriate updates in the temporary memory buffers to such data or metadata to accomplish the operation. In the current example, file system 115 loads data from file descriptor 200 into temporary memory buffer 270, determines that the currently allocated size of the file is not sufficient for writing new data to the file and concludes that a new block needs to be allocated for the file (i.e., no updates need to be made at this stage in step 320). In step 325, file system 115 assesses whether any other locks are needed for the transaction. In the current example, lock 215 relating to block bitmap 210 is needed to allocate a block for file descriptor 200 such that the flow returns to step 305 to acquire lock 215. Once lock 215 is acquired, in step 310, it is registered with transaction data structure 260 (see 275 of FIG. 2A). In step 315, file system 115 reads block bitmap 210 into temporary memory buffer 270 and scans block bitmap 210 to find a bit representing a free block and in step 320, marks the free block as used and proceeds to decision step 325.

Once there are no more locks to acquire for the transaction, the flow proceeds to step 330 to determine whether any more data or metadata needs to be modified. In the current example, the flow returns to step 315 and then to step 320 because file system 115 needs to add a reference to the free block acquired from bitmap 210 into file descriptor 200. The modifications made to bitmap 210 and file descriptor 200 in temporary memory buffer 270 are represented by arrow 280 in FIG. 2A, resulting in the creation of bitmap $210_{NEW}$ (bit for free block marked used) and file descriptor $200_{NEW}$ (reference to free block added). The flow returns to decision step 330 and if there are no more metadata or data modifications to be made, in step 335 and as shown as 285 in FIG. 2A, file system 115 writes the modified data or metadata into the transaction data structure in memory, thereby creating a fully formed transaction (see, e.g., discussion of a transaction's log action in the '724 Application). In step 340 and as shown as 290, file system 115 writes or commits the fully formed transaction to journal region 255. In step 345 and as shown as 295 of FIG. 2A, the updates (e.g., bitmap $210_{NEW}$ and file descriptor $200_{NEW}$) stored in the transaction are written into the data or metadata locations residing on disk resulting in updated versions of such data or metadata in accordance with the saved transaction in the journal. In the current example, the updates reflect that the file corresponding to file descriptor 200 has been allocated a new data block (and block bitmap 210 has marked the relevant bit in its bitmap as used). In step 350, the file system releases the locks relating to the data or metadata (i.e., locks 210 and 215 in the current example), for example, by zeroing out their respective owner field.

Figure 4:
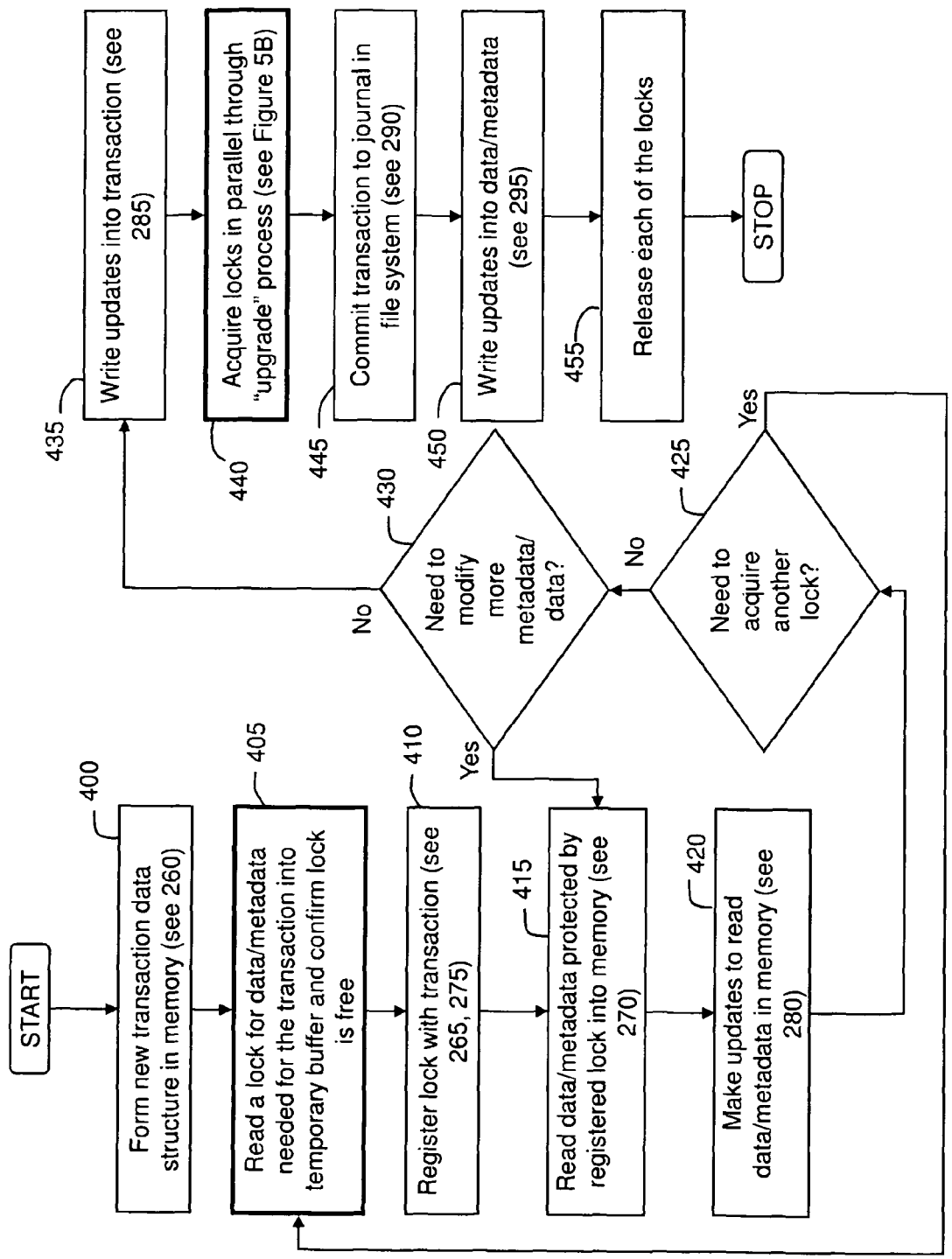
FIG. 4 is a flow chart for committing a transaction on a shared file system using "optimistic locking" techniques.

As previously discussed, the serial acquisition of locks performed in the loop created by steps 305 through 325 requires reserving the data storage unit on which the locks are stored for each lock that needs to be acquired. Each of these reservations precludes other contexts from accessing any data residing on the data storage unit even if such data is unrelated to the transaction at hand. FIG. 4 is a flow chart for committing a transaction on a shared file system that reduces the multiple reservations required in the flow chart of FIG. 3 into a single reservation, thereby reducing the amount of time that the data storage unit is exclusively possessed by the context executing the transaction. The process outlined in FIG. 4, referred to herein as "optimistic locking," leverages the observation that the occurrence of different contexts simultaneously competing for the same locks is uncommon and therefore "optimistically" delays reserving a data storage unit for the purposes of acquiring a lock so that other contexts can access unrelated data stored on the data storage unit.

In step 400, file system 115 forms a new transaction data structure in memory similar to step 300. In step 405, instead of acquiring a lock as in step 305, file system 115 instead reads a copy (or portion thereof, including, for example, the lock's version field) of the lock into a temporary memory buffer, such that no reservation of the data storage unit is required and confirms that the lock is currently free. This step provides file system 115 a record of the state of the lock during the beginning of the transaction committing process. Because the lock has not been acquired, any other context could possibly subsequently acquire the lock (and change the state of the lock by incrementing its version field). In step 410, file system 115 registers the lock with the transaction data structure in memory similar to step 310. Similar to steps 315 to 335, in steps 415 to 435, file system 115 reads the corresponding data or metadata from disk into temporary memory buffers, makes the appropriate updates in the temporary memory buffers to such data or metadata, and writes the updates to the data or metadata into the transaction data structure in memory, thereby creating a fully formed transaction. In step 440, in contrast to the process of FIG. 3, file system 115 now attempts to acquire the locks in parallel through an "upgrading" process that is further detailed in FIG. 5 and discussed further below. This upgrading process involves only one reservation of the data storage unit in contrast to the multiple serial reservations involved in the loop created by steps 305 through 325. If the upgrading process of step 440 successfully acquires all the locks, then in step 445, file system 115 commits the fully formed transaction to journal region 255. In step 450, the updates stored in the transaction are written into the data or metadata locations residing on disk resulting in updated versions of such data or metadata in accordance with the saved transaction in the journal and in step 455, the file system releases the locks relating to the data or metadata.

Figure 5:
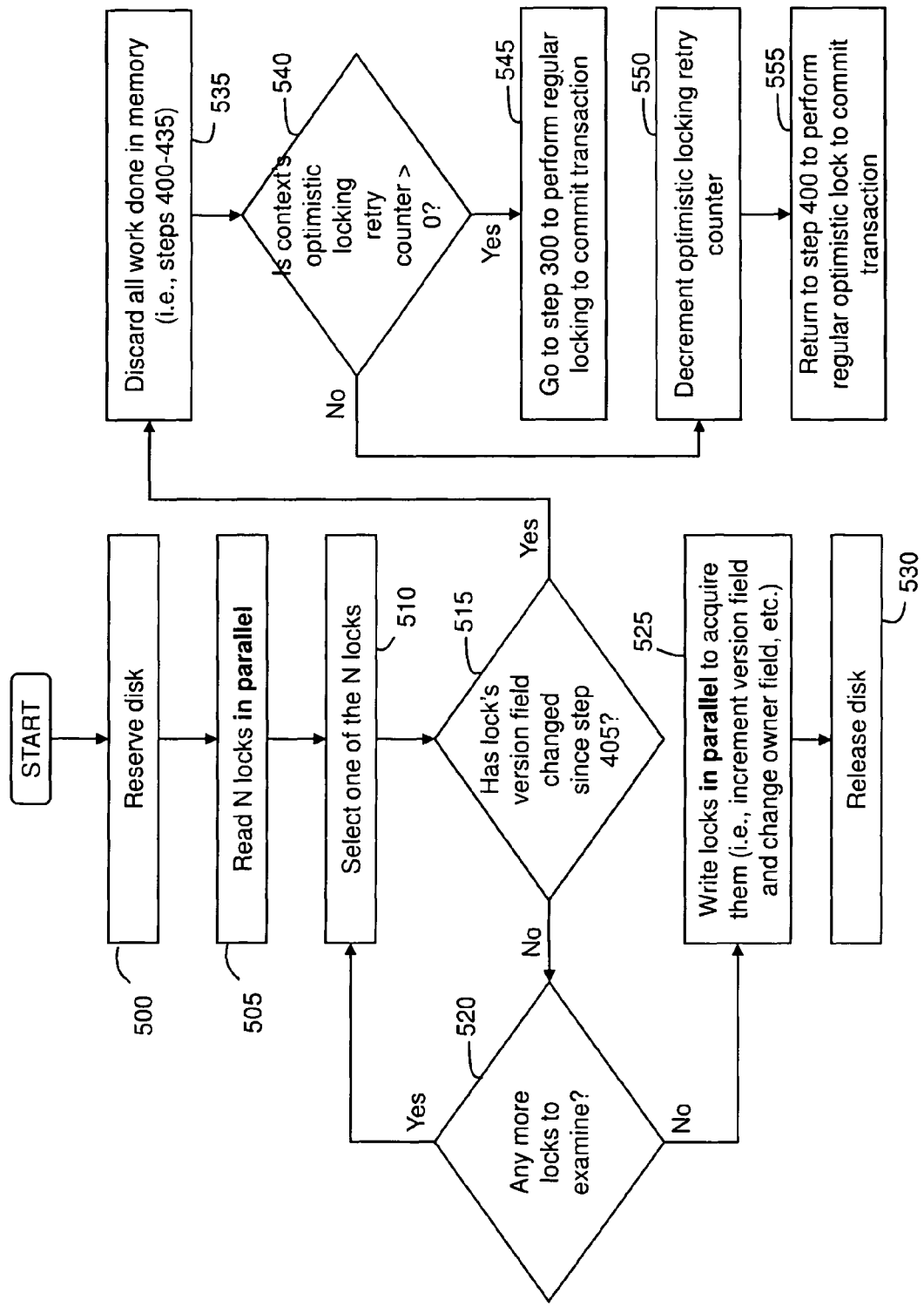
FIG. 5 is a flow chart for upgrading locks during optimistic locking.

FIG. 5 is a flow chart illustrating the upgrading process of step 440 used to acquire locks relating to a transaction. In step 500, file system 115 (on behalf of the current context) reserves the data storage unit containing the locks (e.g., through a conventional SCSI reserve command). In step 505, each of the locks in the fully formed transaction (of step 435) are read from file system 115 again, for example, by accessing their address fields in the fully formed transaction to find the locks on file system 115. Because the addresses of these locks are stored in the fully formed transaction, the locks can be read from file system 115 in parallel (e.g., through conventional pipelined SCSI transmitted commands) rather than serially (as in step 305), thereby minimizing time spent while the data storage unit is reserved. In steps 510 to 520, each lock's version number is compared to its previous version number stored from step 405. A changed version number indicates that a different context had successfully acquired the lock (and likely changed its related data/metadata) while the current context was performing steps 400 to 435. If no version numbers have changed in step 515 and no more locks need to be examined in step 520, then in step 525, file system 115 acquires the locks (e.g., in parallel through conventional SCSI pipelined commands) by, for example, writing the own ID value of the current context's server into the locks' owner field and by writing a new time value into the locks' liveness field. In step 530, file system 115 releases the reservation on behalf of the current context.

Figure 6A:
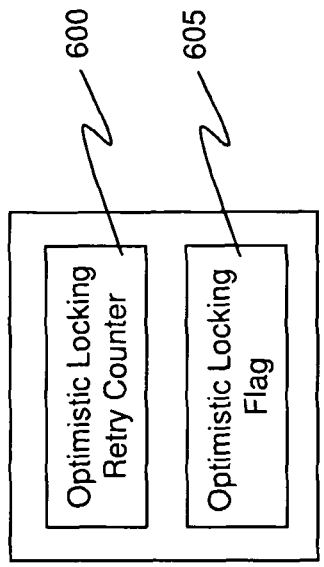
FIG. 6A depicts a per-context optimistic locking record.

If, however, step 515 indicates that a lock's version number has changed, the upgrade process fails and all in-memory work performed in steps 400 to 425 is discarded in step 535. In decision step 540, file system 115 checks an optimistic locking record associated with the context to determine whether a optimistic locking retry counter is greater than zero. FIG. 6A depicts one embodiment of such an optimistic locking record for a context. Optimistic locking retry counter 600 is a configurable number indicating the number of times the optimistic locking process of FIG. 4 should be tried before reverting to the regular locking process of FIG. 3. It should be recognized that optimistic locking retry counter can be configured by a user or administrator, for example, depending upon the characteristics of a particular application relating to the context. An administrator may, for example, configure optimistic locking retry counter 600 to be less for latency sensitive applications when compared, for example, to more latency tolerant applications. In one embodiment, a context's optimistic locking record may also have a optimistic locking flag 605 which indicates whether or not the optimistic locking process of FIG. 4 should ever be used for the particular context. Returning to decision step 540 of FIG. 5, if the optimistic locking retry counter is greater than zero, file system 115 decrements the counter in step 550 and returns to step 400 of FIG. 4 to retry the optimistic locking process in step 555. If, in decision step 540, the optimistic locking retry counter is zero, then file system 115 goes to step 300 of FIG. 3 and reverts to regular locking in step 545.

In certain scenarios, a context's optimistic locking record as used in FIG. 5 and detailed in FIG. 6A can inadvertently cause a context to prematurely switch to regular locking due to nested transactions issues. For example, an operating system call made by an application to allocate a large amount of storage (e.g., 4 gigabytes (GB)) to a file can be translated by the file system into a number of lower level instructions that include several separate but nested transactions. The successful completion of a first transaction relating to the operating system call may be dependent upon the completion of several subsequent transactions. Specifically, a first transaction of the foregoing system call may have the task of updating a size field of a file descriptor to a value of 4 GB. This first transaction, however, cannot be completed until other subsequent transactions actually allocate 4 GBs of storage to the file (in segments of 256 megabytes (MB), for example). The pseudo-code below provides an example of such foregoing nested transactions:

```
executeTxn(allocate, 4GB, fileDescriptor) {
    size = getFileSize(fileDescriptor);
    while (size < 4GB) {
        executeTxn(blockBitmap, fileDescriptor, 256MB);
        size = getFileSize(fileDescriptor);
    }
    updateFileDescriptorField(sizeField, 4GB);
    commit and return success;
}
```

In the foregoing pseudo-code, if any of the nested executeTxn commands (i.e., execute transactions) fail, a per-context's optimistic locking retry counter as in FIG. 6A will be decremented such that subsequent executeTxn commands may not have any optimistic locking retries left to use.

Figure 6B:
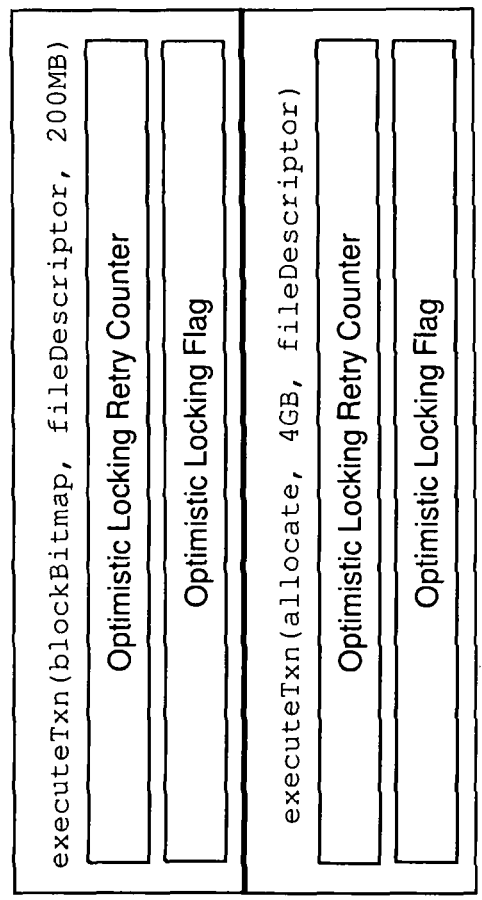
FIG. 6B depicts an optimistic locking record stack to achieve per-transaction optimistic locking retries.

FIG. 6B provides an alternative optimistic locking retry tracking method that utilizes a per-context stack to provide per-transaction retry counters as opposed to the per-context retry counter of FIG. 6A. In the foregoing pseudo-code example, the stack of FIG. 6B pushes a optimistic locking record for each nested executeTxn command in the while loop and upon completion of the transaction, pops the record off the stack. In this manner, each transaction corresponding to an operating system call can be allocated its own optimistic locking retry counter.

In certain scenarios, actions are performed on data relating to acquired locks in the regular locking flow of FIG. 3 that cannot be similarly performed in the optimistic locking flow of FIG. 4 because the locks have not been similar acquired. For example, during a transaction that allocates a block to a file (as exemplified in FIG. 2A), file system 115 may zero out the allocated block (e.g., for security and privacy reasons) prior to committing the transaction to journal 255 in step 330. During a regular locking process of FIG. 3, file system 115 is able to perform this zeroing because it has acquired the appropriate locks which control access to the block. In contrast, because the optimistic locking process of FIG. 4 does not acquire the lock, file system 115 cannot zero out the block without risking possible data corruption or loss (i.e., because another context may have acquired the lock relating to the block in the meantime and may have stored useful data in the block).

Figure 7A:
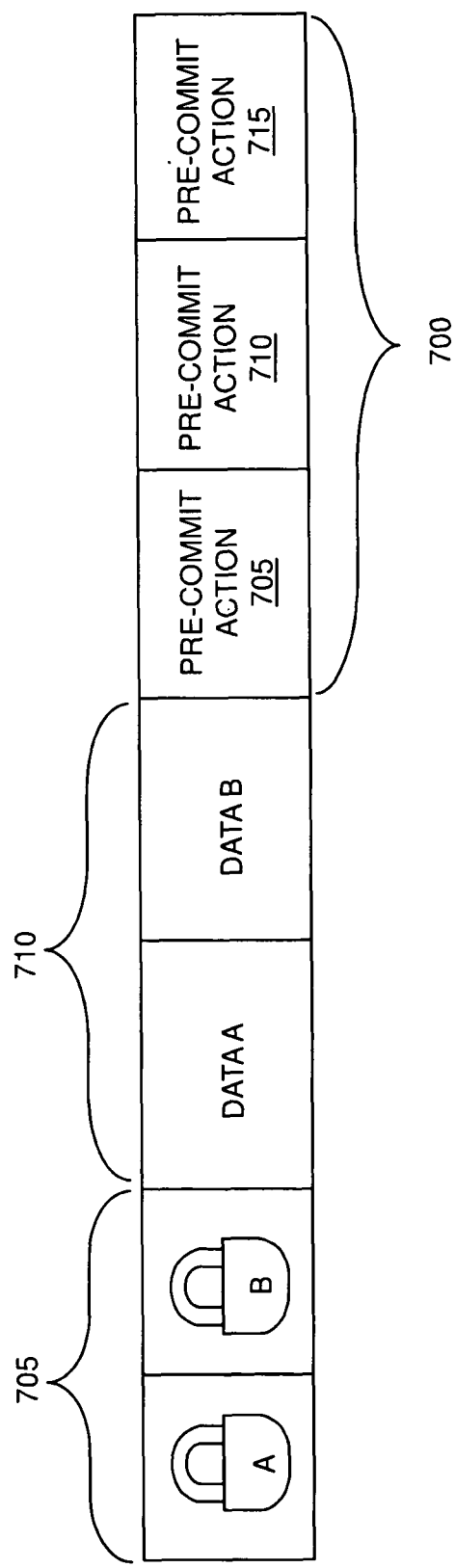
FIG. 7A depicts a transaction data structure with a pre-commit actions buffer.

FIG. 7A illustrates an extended transaction data structure in memory (e.g., similar to 260 in FIG. 2A) that incorporates a pre-commit action buffer 700 in addition to previous records of locks 705 and data changes 710. It should be recognized that while FIG. 7A illustrates a transaction data structure for a transaction that operates on two sets of data relating to two lock records, any number of locks and data sets (e.g., one lock may relate to multiple data sets, etc.) may make up any particular transaction data structure depending upon the particular operation involved. Pre-commit action buffer 700 provides a file system that is performing the optimistic locking process of FIG. 4 the ability to record certain actions (such as pre-commit actions 705, 710 and 715) that should be performed on data or metadata relating to the transaction prior to committing the transaction.

Figure 7B:
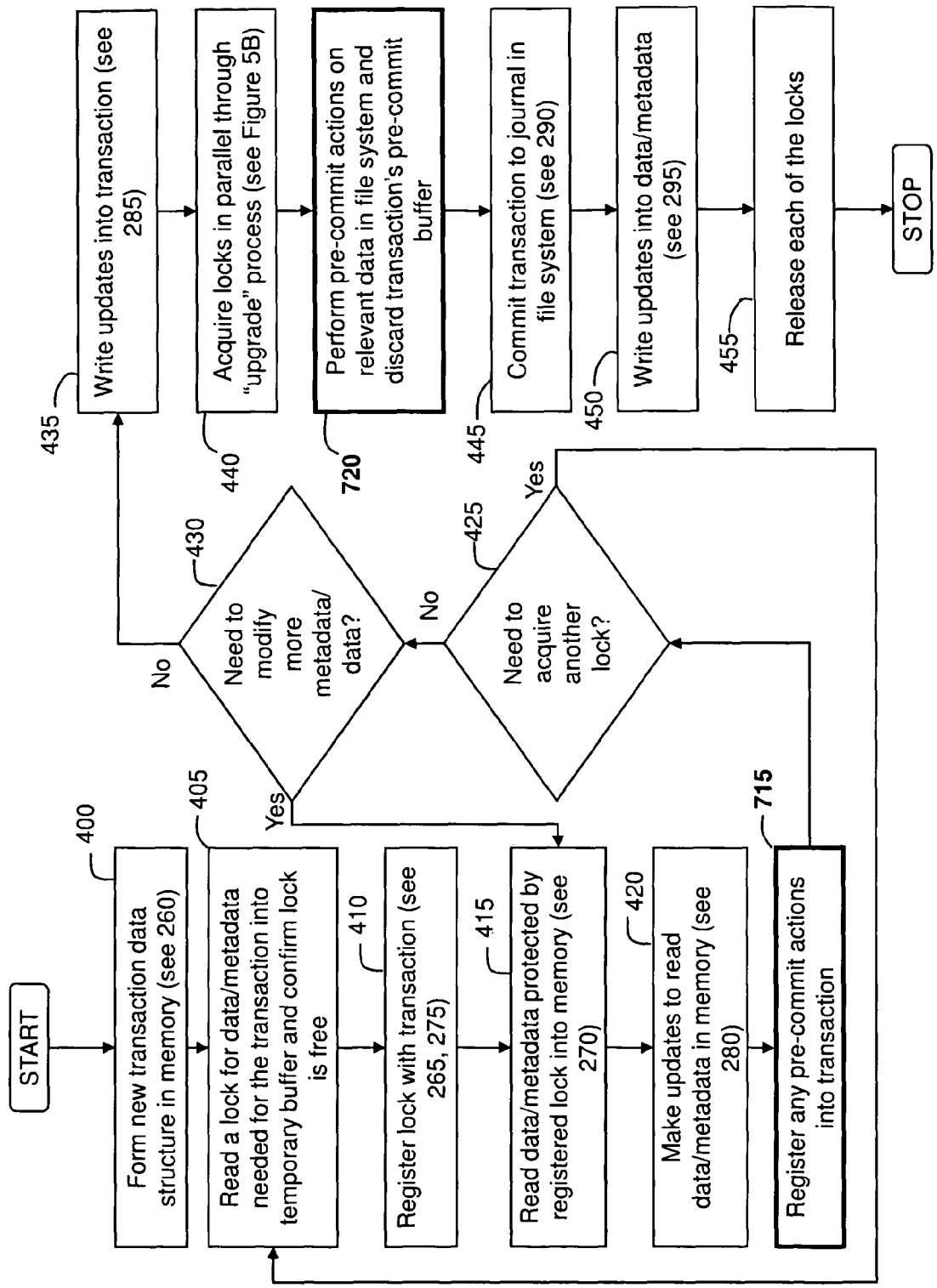
FIG. 7B is a flow chart for committing a transaction on a shared file system using "optimistic locking" techniques that incorporate pre-commit actions.

FIG. 7B illustrates an optimistic locking process incorporating such pre-commit actions. In step 715, file system 115 is able to insert any pre-commit actions into pre-commit actions buffer 700 of the transaction data structure. For example, file system 115 can insert instructions to zero out a block that is to be allocated to a particular file upon committing the transaction. It should be recognized, that step 715 may be performed, in alternative embodiments, anytime after step 405 and before step 440, and not necessarily after step 420 as depicted in the embodiment of FIG. 7B. After successfully acquiring the relevant locks through upgrading step 440, file system 115 is able to execute the pre-commit actions in buffer 700 on the data (e.g., zero out the block on file system 115) in step 720 and then discard the buffer prior to committing the transaction in step 445.

Figure 8:
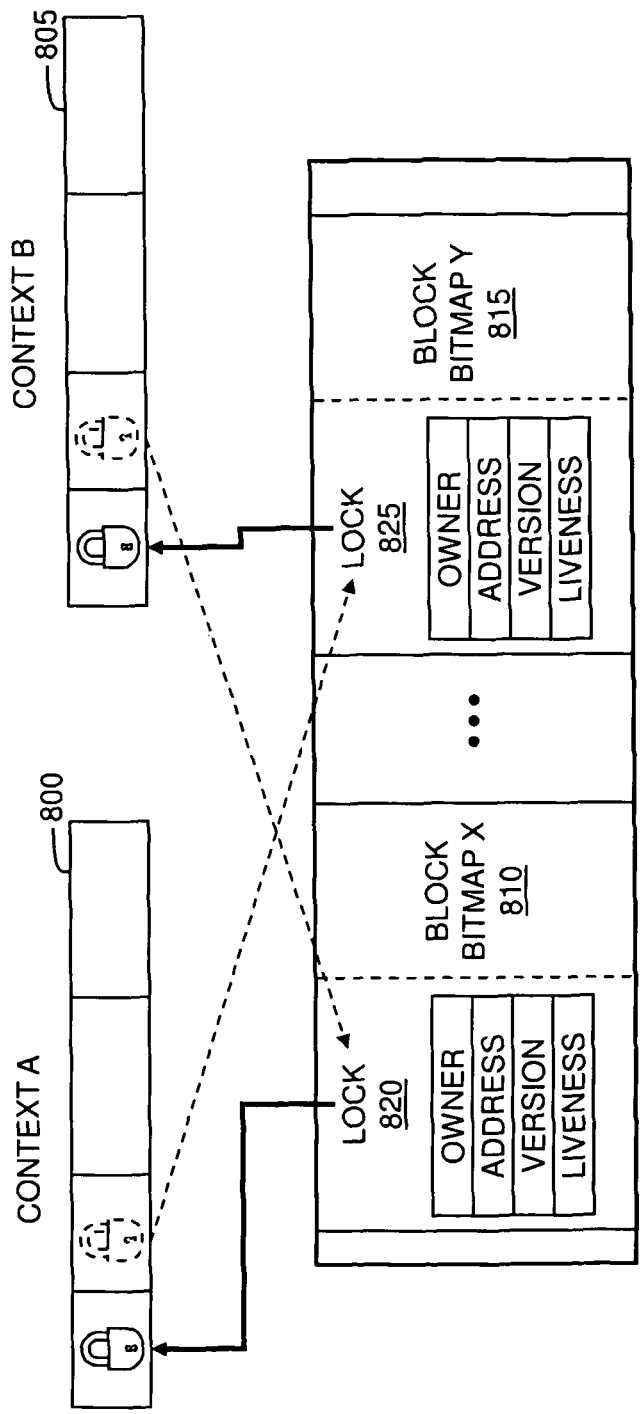
FIG. 8 depicts a deadlock situation with two contexts utilizing regular locking.

One embodiment of the optimistic locking process of FIG. 4 additionally eliminates possible deadlock scenarios that may have occurred in the regular locking process of FIG. 3. Because locks are serially acquired in step 305 of FIG. 3 and may be acquired in any order, competing contexts can deadlock waiting for locks that other contexts have acquired. As illustrated in FIG. 8, transaction 800 of context A and transaction 805 of context B may both desire to obtain access to block bitmap 810 and block bitmap 815 in order to allocate blocks. As each context performs step 305 of FIG. 3 to obtain corresponding locks 820 and 825, transaction 800 successfully acquires lock 820 while transaction 810 successfully acquires lock 825. Transaction 800 will continue to trying to subsequently acquire lock 825 and transaction 805 will similarly continue trying to subsequently acquire lock 820, resulting in deadlock. In contrast, because the optimistic locking process of FIG. 4 does not wait for locks, deadlock scenarios will not arise. Instead of waiting for locks, the optimistic locking process of FIG. 4 simply fails at decision step 515 of FIG. 5 and restarts the transaction. It should be further recognized that, because the addresses of all needed locks are stored in a fully formed transaction by step 435 of FIG. 4, the locks can also be acquired, sequentially, in increasing lock offset order (in contrast to the parallel acquisition of locks in step 440) to avoid a deadlock situation (e.g., although such an embodiment may be less effective in reducing disk reservation inefficiencies).

Those with ordinary skill in the art will recognize that the embodiments described herein are merely exemplary and that various alternative embodiments may be implemented consistent with the teaching disclosed herein. For example, it should be recognized that computer system configurations other than FIG. 1 may be utilized in accordance with the present invention. In one embodiment, each server may run a number of virtual machines that access a shared file system across the servers. Alternatively, the virtual machines of each server may share a file system (i.e., each server has a different file system). Similarly, certain aspects of the described embodiments may be considered refinements or enhancements. For example, an embodiment may not necessarily read and write locks in parallel in steps 505 and 525. Additionally, embodiments of the present invention may utilize alternative suggestions, teachings or additional details as described the '724 Application, '613 Application, and '109 Application, each of which is incorporated by reference.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. In a shared file system that is accessible by a group of servers, wherein the shared file system resides in a data storage unit having a logical storage space that is contiguous and maps to physical storage space of a shared storage array, a method for committing a transaction acting upon data stored in the logical storage space of said data storage unit, the method being carried out by a server in said group and comprising:

reading a state of a set of locks relating to the data from the data storage unit, wherein the data and data fields of the locks relating to the data are stored in the logical storage space of the data storage unit;

constructing a completed transaction in memory of said server prior to acquiring the locks;

after said constructing, acquiring exclusive possession of the data storage unit, wherein said acquiring prevents other servers in the group from accessing the logical storage space of the data storage unit;

while having exclusive possession of the data storage unit, acquiring the locks if the state of the locks has not changed since said reading; and committing the completed transaction, where said acquiring the locks includes writing a unique identifier associated with said server into one of the data fields of each of the locks.

2. The method of claim 1, further comprising: journaling the completed transaction to the data storage unit prior to said committing.

3. The method of claim 1, wherein each of the locks has a version data field that is incremented upon said lock's acquisition or release and determining that the state of a lock has changed if the version data field of the lock has changed.

4. The method of claim 1, wherein said acquiring exclusive possession of the data storage unit step uses a SCSI (Small Computer System Interface) reservation command.

5. The method of claim 4, wherein said acquiring the locks occurs using SCSI (Small Computer System Interface) pipelined commands.

6. The method of claim 1, wherein the completed transaction in memory comprises a data structure comprising a record of locks relating to the data and a record of updates to be performed on said data.

7. The method of claim 1, further comprising: adding pre-commit actions to a pre-commit actions buffer of the completed transaction; and executing the pre-commit actions after said acquiring the locks and before said committing the completed transaction.

8. The method of claim 1, wherein the data is metadata for a file.

9. The method of claim 1, wherein the data storage unit is a logical data storage unit exposed by a controller of the shared storage array.

10. The method of claim 1, further comprising: checking a retry counter if the state of the locks has changed; and re-performing said method if the retry counter is greater than zero.

11. The method of claim 10, wherein the retry counter relates to the transaction.

12. The method of claim 10, wherein the retry counter relates to a context corresponding to the transaction.

13. A computer system with a shared file system accessed by a plurality of servers, the computer system comprising:

a plurality of servers, wherein each of the servers comprises a processor, a random access memory (RAM) and an operating system accessing the shared file system; and a shared storage array coupled to the plurality of servers, wherein the shared storage array comprises a controller that exposes to the servers a data storage unit in which the shared file system is stored, the data storage unit having a logical storage space that is contiguous and maps to physical storage space of the shared storage array, wherein each server's processor is programmed to perform the following steps to commit a transaction for a process running on said server:

reading a first state of a set of locks relating to data to be acted upon by the transaction from the data storage unit, wherein the data and data fields of the locks relating to the data are stored in the logical storage space of the data storage unit;

constructing a completed version of the transaction in said server's RAM prior to acquiring the locks;

after said constructing, acquiring exclusive possession of the data storage unit, wherein said acquiring prevents other servers coupled to the shared storage array from accessing the logical storage space of the data storage unit;

while having exclusive possession of the data storage unit, checking if the locks have changed state since the first state, and acquiring the locks if the state of the locks has not changed since the first state; and committing the completed transaction to a journal in the data storage unit, wherein said acquiring the locks includes writing a unique identifier associated with said server into one of the data fields of each of the locks.

14. The computer system of claim 13, wherein the shared storage array is a disk array and is coupled to the plurality of servers through a storage area network (SAN).

15. The computer system of claim 13, wherein each of the servers is further configured to instantiate virtual machines.

16. A non-transitory computer readable storage medium having stored therein a computer program for causing a server to commit a transaction acting upon data stored in a data storage unit having a logical storage space that is contiguous, maps to physical storage space of a shared storage array, and is accessible by said server and other servers, wherein said server executing the computer program carries out:

reading a state of a set of locks relating to the data from the data storage unit, wherein the data and data fields of the locks relating to the data are stored in the logical storage space of the data storage unit;

constructing a completed transaction in memory prior to acquiring the locks;

after said constructing, acquiring exclusive possession of the data storage unit, wherein said acquiring prevents the other servers from accessing the logical storage space of the data storage unit;

while having exclusive possession of the data storage unit, acquiring the locks if the state of the locks has not changed since said reading; and committing the completed transaction, wherein said acquiring the locks includes writing a unique identifier associated with said server into one of the data fields of each of the locks.

17. The non-transitory computer readable storage medium of claim 16, wherein said server executing the computer program further carries out journaling the completed transaction to the data storage unit prior to said committing.

18. The non-transitory computer readable storage medium of claim 16, wherein said server executing the computer program further carries out:

adding pre-commit actions to a pre-commit actions buffer of the completed transaction; and executing the pre-commit actions after the step of acquiring the locks and before the step of committing the completed transaction.

19. The non-transitory computer readable storage medium of claim 16, wherein said server executing the computer program further carries out:

checking a retry counter if the state of the locks has changed; and re-executing the steps if the retry counter is greater than zero.

20. The non-transitory computer readable storage medium of claim 16, wherein each of the locks has a version data field that is incremented upon said lock's acquisition or release and determining that the state of a lock has changed if the version data field of the lock has changed.

* * * * *